United States Patent [19]

Gonzalez

[11] Patent Number: 4,831,774
[45] Date of Patent: May 23, 1989

[54] MARINE LIFE TRAP

[76] Inventor: Thomas R. Gonzalez, 7048 Wheeler St., Philadelphia, Pa. 19142

[21] Appl. No.: 57,959

[22] Filed: Jun. 4, 1987

[51] Int. Cl.$^4$ .............................................. A01K 69/00
[52] U.S. Cl. ........................................ 43/100; 43/102
[58] Field of Search ................... 43/100, 102, 103, 62

[56] References Cited

U.S. PATENT DOCUMENTS

| 85,199 | 12/1868 | Beach | 43/62 X |
|---|---|---|---|
| 4,262,379 | 4/1981 | Jankiewicz | 43/100 X |
| 4,373,288 | 2/1983 | McCrink | 43/102 X |
| 4,393,617 | 7/1983 | Charnoske | 43/100 X |
| 4,507,093 | 3/1985 | Norvell | 43/100 X |

FOREIGN PATENT DOCUMENTS 575021  1/1946  United Kingdom .................... 43/62

*Primary Examiner*—Nicholas P. Godici
*Assistant Examiner*—Carmine Cuda

[57] ABSTRACT

A marine life trap that is used primarily for trapping crustaceans, such as crabs and lobsters, which trap includes a base with an upstanding center post on which a top portion is slidably mounted, with a downwardly extending perimeter net, the top portion being hollow and having an opening in the bottom that is closed off by a valve and with a hose attached to the top and to an inflatable element. The valve has a cord attached thereto and to bait, so that upon disturbance of the bait the valve is opened, water flows into the top portion causing it and the net to slide downwardly on the post and also displacing the air trapped therein, which fills the inflatable element and causes it to rise to the surface to signal the fisherman that the top portion and net have fallen to enclose the bait and trap the marine life.

3 Claims, 1 Drawing Sheet

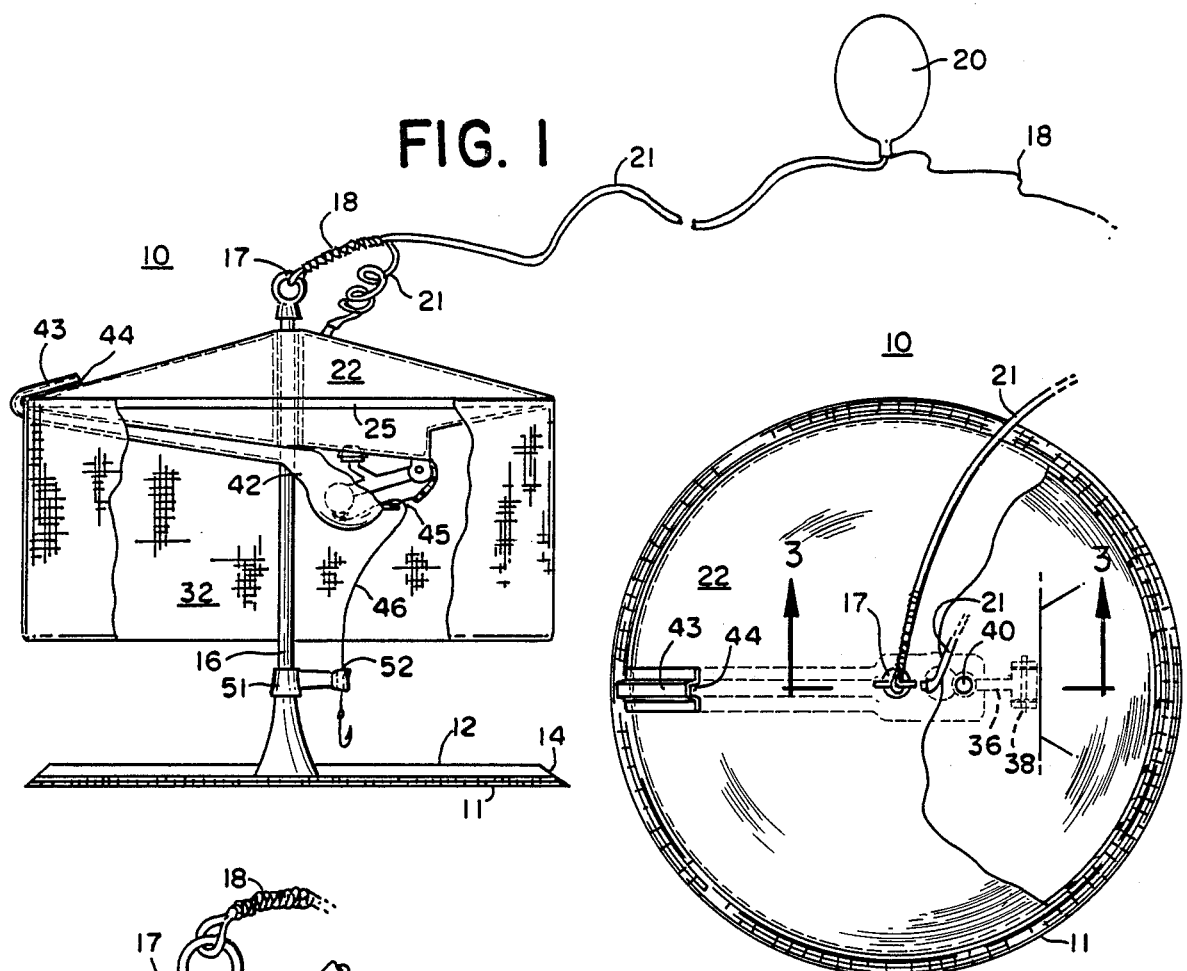
FIG. 1
FIG. 2
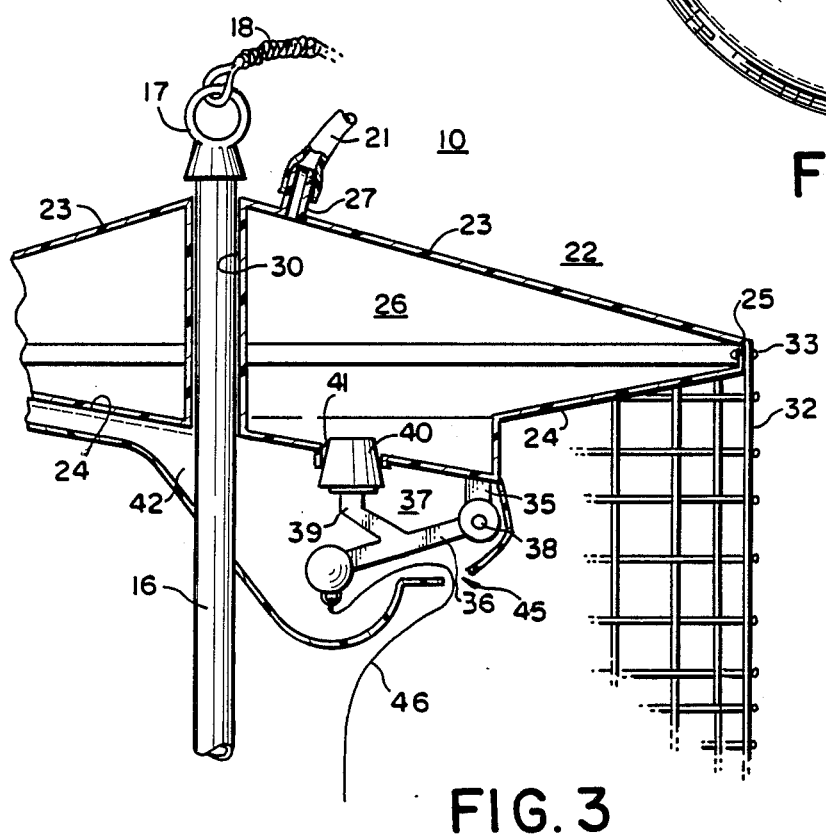
FIG. 3

MARINE LIFE TRAP

BACKGROUND OF THE INVENTION

1. Field of the Invention

This invention relates to a trap for marine life of the type that includes provisions to both securely contain the marine life and to signal to the fisherman that the bait has been disturbed and the trap closed on the marine life.

2. Description of the Prior Art

Fishermen who are seeking to trap marine life, such as crabs and lobsters, usually place their traps in an area believed to contain them, and leave the traps for a time. The fisherman then returns and takes up all his traps, and does not know until he removes and examines the traps whether he has caught anything.

Since space on most fishing boats is at a premium, it is not desirable to store and to transport a large number of empty traps to and from the fishing area each day.

The most common form of trap includes a funnel arrangement and a chamber containing bait, to lure the marine life into the chamber through the funnel, which traps do not provide for signalling of trapping. Other forms of traps involve collapsible devices, which also suffer from problems in that they require the fisherman to manually close the trap, or the trap is automatically closed after a pre-set time. Examples of such traps are disclosed in the U.S. Pat. No. 2,679,125 to Howard; McCrink No. 4,373,288; and Litrico No. 4,445,295, but they all suffer from one or more of the described problems.

The trap of my invention solves the problem of effectively trapping the marine life when the bait is disturbed, and also signals the fisherman that the bait has been disturbed and the trap collapsed, reducing the necessity for premature removal and transportation of empty traps, therefore greatly increasing the efficiency of the fisherman's operation.

SUMMARY OF THE INVENTION

A trap for marine life having a portion which collapses upon disturbance of the bait, and also provides a visible signal to the fisherman that the bait has been disturbed and that the top has collapsed, capturing the marine life.

The principal object of the invention is to provide a trap for marine life that operates automatically.

A further object of the invention is to provide a trap of the character aforesaid that, upon actuation, provides a visible signal to the fisherman.

A further object of the invention is to provide a trap of the character aforesaid which can be used to capture a wide variety of marine life.

A further object of the invention is to provide a trap of the character aforesaid which is economical to construct, but simple and positive in operation.

A further object of the invention is to provide a trap of the character aforesaid which can be readily deployed and redeployed for use by a single fisherman.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a side elevational view of the trap of the invention, partly broken away to show the interior structure;

FIG. 2 is a top elevational view of the trap of FIG. 1; and

FIG. 3 is a vertical sectional view taken approximately on the line 3—3 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the trap 10 as illustrated includes a base 11 of circular configuration, preferably formed of molded plastic of well known type that is resistant to seawater and to temperature change.

The base 11 has a top surface 12 with a perimeteral edge 14 which slopes downwardly from the top surface 12 to permit the marine life to easily climb onto the top surface.

The base 11 in the center thereof has a post 16 extending vertically therefrom, which post 16 may be of metal and is non-corrosive.

The post 16 is provided with an eye ring 17, which has a cord 18 attached thereto and which may be fastened to a boat or buoy (not shown) after the trap 10 has been placed in a location to capture the desired marine life.

An inflatable element 20 is provided, which is normally in a deflated condition, and which may be constructed of natural or synthetic rubber, with a hose 21 attached thereto, extending along and attached to the cord 18 and to a top member 22 of trap 10. The top member 22 is of wedge shaped circular configuration, with a top wall 23 and a bottom wall 24 both of which slope outwardly, and meet at an edge 25. The top member 22 has a hollow interior 26 and the hose 21 is attached to a hollow tube 27 extending from wall 23 and in communication with the interior 26.

The top wall 23 and bottom wall 24 at the center of the top member 22 engage a vertically extending hollow bushing 30, which is slidably engaged with the post 16 (to be described).

The top member 22 at the edge 25 has a net 32 attached thereto by any suitable means such as fasteners 33, which net extends therearound and downwardly toward the base 11.

The bottom wall 24 is provided with a boss 35, which has an arm 36 of a valve 37 rotatably attached thereto by a pin 38. The valve 37 has an arm 39 attached to the arm 36 with a stopper member 40 thereon, which stopper is normally engaged with an opening 41 in bottom wall 24, which is in communication with the hollow interior 26 of the top 22.

A housing 42, which is constructed of any suitable flexible material such as synthetic rubber, is provided, which surrounds the valve 37, and with a hollow tube 43 which extends to a first water inlet 44 on the top wall 23.

The housing 42 also has a second water inlet 45 through which a cord 46 extends, which is attached to arm 39 and extends downwardly to an arm 51, which is fastened to the post 16 and which cord 46 also extends through opening 52 in arm 51.

Bait (not shown) may be engaged with the cord 46 and suspended over the top surface 14 of base 11 for luring of the marine life (not shown) onto base surface 14.

The mode of operation will now be pointed out.

In use the interior 26 of the top member 22 is filled with air and stopper member 40 is engaged with opening 41. The cord 46 has bait (not shown) attached thereto and placed on the base surface 14. The trap 10 may then be lowered into the water by cord 18 with the buoyancy of the top member 22 (due to the air entrapment) causing it to move upwardly on the post 16.

When the marine life such as a crab or lobster (not shown) grabs the bait (not shown) the cord 46 pulls down on arm 39 causing valve 37 to pivot about boss 35, and to move the stopper member 40 out of opening 41, whereby water may flow into first water inlet opening 44, second water inlet opening 45, and into interior 26 of top member 22. The water flowing into interior 26 displaces the entrapped air forcing it out through tube 27 and hose 21 to the inflatable element 20, which then rises to the surface of the water to signal the fisherman that the bait (not shown) has been disturbed. The air displacement from member 22 causes it to lose its buoyancy and move downwardly on post 16 causing the net 32 to move downwardly and capture the marine life (not shown) that disturbed the bait (not shown).

The trap 10 may be removed from the water, the marine life removed, the inflatable element 20 deflated to fill the interior 26 with air, the stopper member 40 engaged with the opening 41, and the trap 10 lowered into the water for use.

It will thus be seen that a trap has been provided with which the objects of the invention are achieved.

I claim:

1. A marine life trap for capturing crustaceans while underwater which comprises
    a base,
    a post extending upwardly from said base,
    an air tight top portion slidably mounted on said post,
    said top portion having a hollow interior,
    valve means engaged with said top portion to normally retain trapped air therein,
    signalling means attached to said top portion and being actuated by the operation of said valve means,
    said top portion is of circular wedge shaped construction,
    a perimeteral net is provided attached to said top portion and extending downwardly therefrom,
    said valve means includes a housing having at least one water inlet,
    said top portion includes a top wall and a bottom wall,
    a boss on said bottom wall,
    a valve pivotedly mounted to said bottom wall,
    an opening in said bottom wall for communication with said hollow interior,
    said valve having a stopper normally engaged with said opening,
    a cord attached to said valve for actuation by said crustaceans for release of trapped air to said signalling means.
2. A marine life trap as defined in claim 1 in which
    said signalling means includes a hose attached to and in communication with said hollow interior of said top portion, and
    an inflatable element connected to said hose for inflation upon movement of said valve and displacement for trapped air by water entering said hollow interior.
3. A marine life trap as defined in claim 2 in which
    said post has an eye ring, and
    another cord is attached to said eye ring for raising and lowering said trap into and out of said water.

* * * * *

UNITED STATES PATENT AND TRADEMARK OFFICE
CERTIFICATE OF CORRECTION

PATENT NO. : 4,831,774

DATED : May 23, 1989

INVENTOR(S) : THOMAS R. GONZALES

It is certified that error appears in the above-identified patent and that said Letters Patent is hereby corrected as shown below:

Cover Page, at Item [76] Left Column

"Thomas R. Gonzalez" should be -- Thomas R. Gonzales --

Signed and Sealed this

Twenty-eighth Day of November 1989

*Attest:*

JEFFREY M. SAMUELS

*Attesting Officer*     *Acting Commissioner of Patents and Trademarks*